June 17, 1930. E. W. MAGILL 1,764,328
CONVERTIBLE VEHICLE BODY
Original Filed July 25, 1927. 2 Sheets-Sheet 1
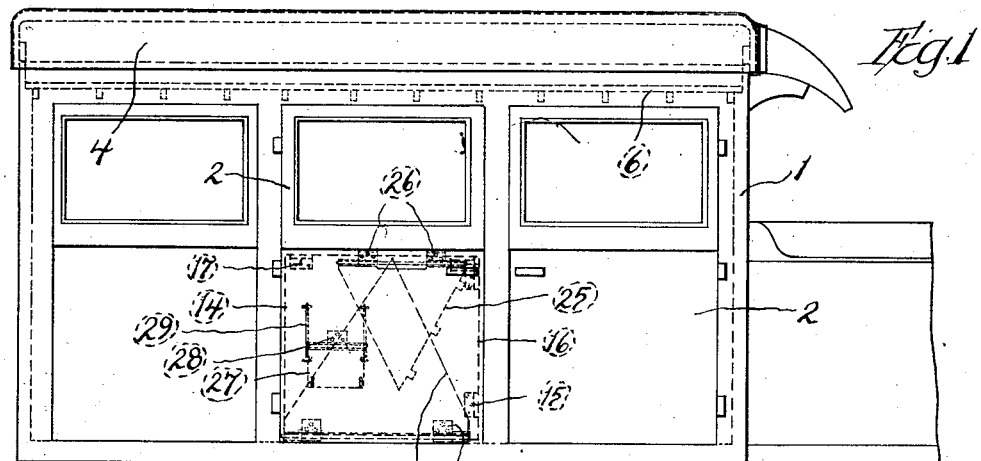
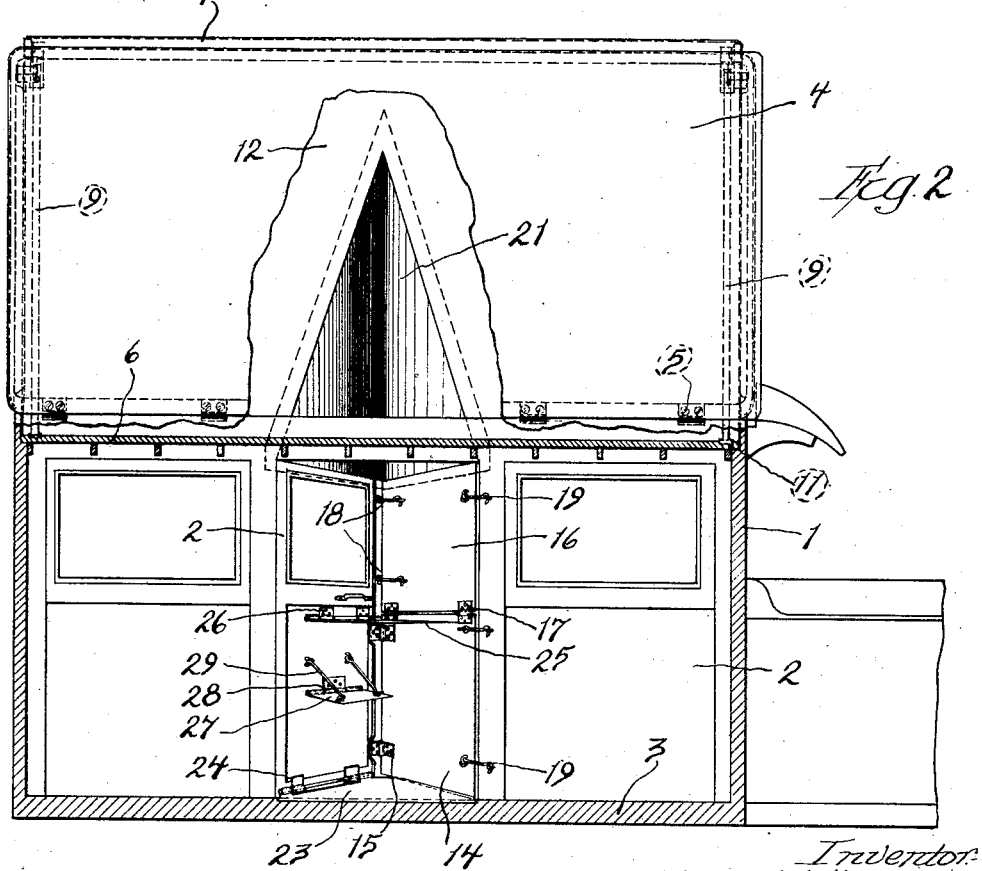
Inventor:
Ellen Willett Magill
By Robert F. Miehle,
Atty.

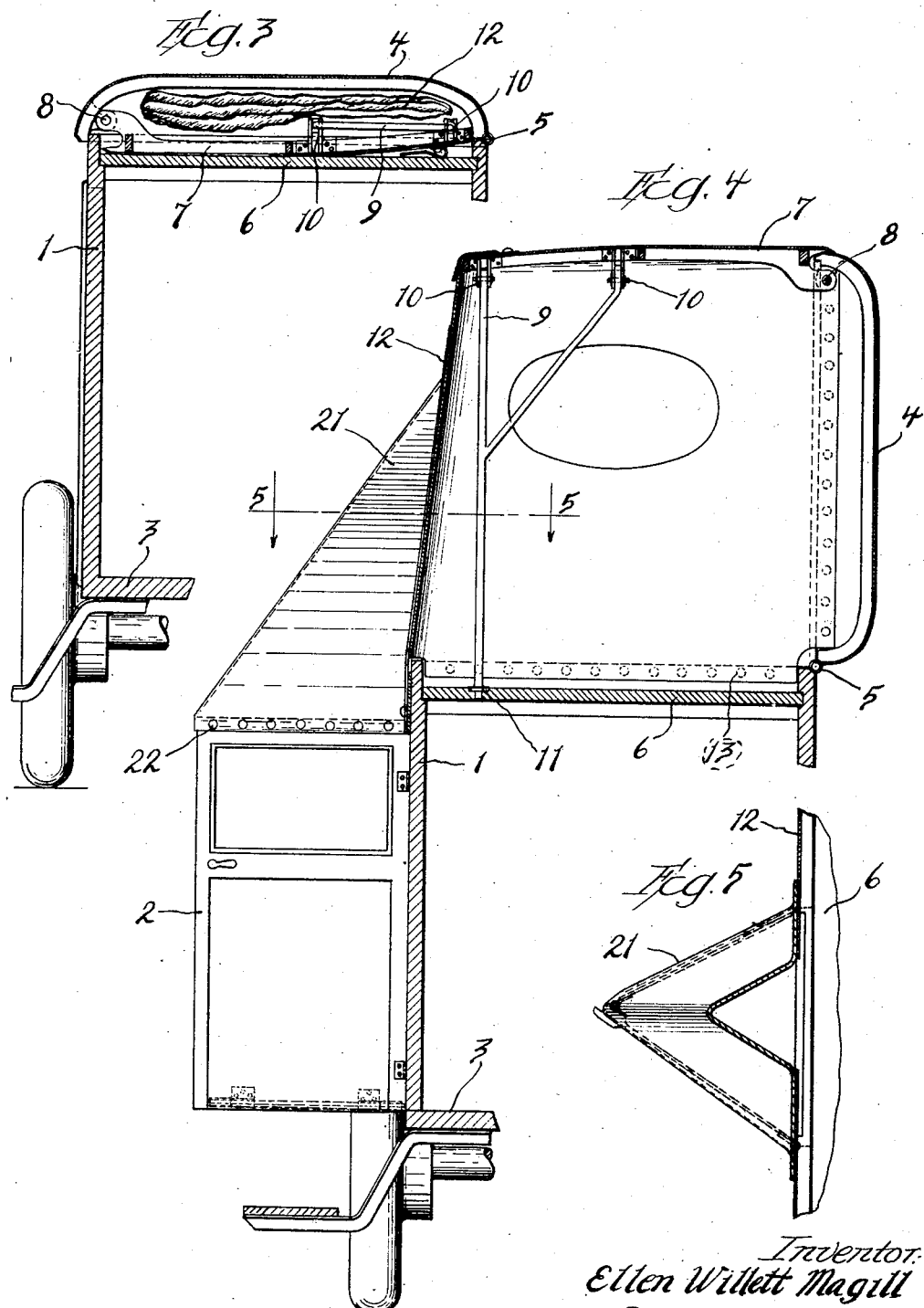

Patented June 17, 1930

1,764,328

UNITED STATES PATENT OFFICE

ELLEN WILLETT MAGILL, OF CHICAGO, ILLINOIS

CONVERTIBLE VEHICLE BODY

Application filed July 25, 1927, Serial No. 208,190. Renewed September 5, 1929.

My invention relates particularly to convertible automobile bodies although not limited to this use alone.

The general objects of the invention reside in the provision of a convertible vehicle body which does not interfere with the normal use of the vehicle for travel or necessitates radical departure in appearance from the present day vehicle bodies, and which is conveniently convertible to provide sleeping quarters all with a view toward providing comfort, privacy, and reasonable safety of the occupants while sleeping and comfort, privacy, and convenience of the occupants in dressing and undressing.

With these objects in view my invention consists in certain objects of novelty in the construction, combination, and arrangement of parts by which the said objects and certain other features, hereinafter appearing, are effected, all as fully described with reference to the accompanying drawings and more particularly pointed out in the appended claims.

In the said drawings—

Figure 1 is a side elevation of an automobile body embodying my invention and showing the same in condition for ordinary use;

Figure 2 is a similar elevation of the same showing the same converted for sleeping and with parts broken away and in section;

Figure 3 is a partial transverse section of the body in condition for ordinary use;

Figure 4 is a similar partial transverse section of the body converted for sleeping;

Figure 5 is a partial section on the line 5—5 of Figure 4.

Like characters of reference indicate like parts in the several views.

Referring to the drawings, the body includes a usual vertical enclosing structure 1 provided with side doors 2 hinged on vertical axes to the stationary portion of the vertical structure, a usual floor 3 at the bottom thereof upon which the usual seating accommodations, not shown, are mounted, and a roof 4 at the top of the vertical structure.

The roof 4 is hinged at one side to the corresponding side of the vertical structure 1 by means of usual hinges 5 for upward angular movement out of its normal horizontal position, as shown in Figures 1 and 3, into a vertical position as shown in Figures 2 and 4. A floor 6 is fixed with the body structure and is disposed immediately below the normal horizontal position of the roof 4 and forms a ceiling for the normal body compartment. A second roof 7 is hinged at a side thereof to the side of the roof 4 opposite that which is hinged to the body structure, as designated at 8, for angular movement from a position underlying the roof 4 to a position normal thereto. Struts 9 are pivoted to said roof 7, as designated at 10, on axes transverse to the axis of this roof for angular movement to and from positions in parallelism with this roof.

When the body is in the condition as shown in Figures 1 and 3, the struts 9 are folded in parallelism with the roof 7 and the roof 7 and the struts 9 underlie the roof 4 with the roof 4 in its normal horizontal position, the roof 7 and the struts 9 being disposed and concealed between the roof 4 and the floor 6.

When it is desired to convert the body for sleeping accommodations the roof 4 is swung to a vertical position and the roof 7 is swung to a horizontal position above the floor 6 and the struts 9 are swung downwardly into vertical positions and have their lower ends engaged in sockets 11 in the floor 6 to releasably secure the roofs 4 and 7 in the positions thereof last mentioned. See Figures 2 and 4. As so positioned the roofs 4 and 7 form a partial shelter above the floor 6, the roof 4 forming a side of this shelter and the roof 7 forming the roof thereof. A curtain 12 of suitable material, such as rubberized cloth, forms the remainder of this shelter and is releasably secured to the adjacent edges of the roofs 4 and 7 and the vertical body structure 1 by means of usual releasable curtain fasteners 13. Thus is an elevated sleeping shelter formed above the floor 6, and the occupants may sleep therein on bedding lying on the floor 6.

Access into the sleeping shelter is provided in the following manner. One of the hereinbefore mentioned doors 2 has a wall member 14, substantially coextensive with the lower portion of the door, hinged at a vertical edge thereof to the outer vertical edge of the door interiorly thereof, as designated at 15, for movement from a position overlying the inside of the door to an extended position with respect thereto. See Figures 1 and 2. A second wall member 16 is hinged at a horizontal edge thereof to the upper horizontal edge of the wall member 14, as designated at 17, for movement from a position overlying said first mentioned wall member to a position extending upwardly therefrom in which position it is releasably secured with the upper portion of the associated door 2 by means of usual hooks and eyes 18. The wall members 14 and 16 when extended, as shown in Figure 2, are adapted to form with the associated door 2, when open, a vertical closed passage outwardly beyond the vehicle body and the floor 6 and communicating with the normal compartment of the body, hooks and eyes 19 releasably securing the free vertical edge portions of the wall members 14 and 16 with the body at the lock sides of the associated door opening of the body. This vertical closed passage is extended upwardly by a half closure curtain formation 21, on the curtain 12, open at its lower end and releasably secured with the upper edges of said wall member 16 and the associated door 2 by usual curtain fasteners 22 and gradually merging upwardly into the plane of the curtain 12. See Figures 2, 4, and 5. Thus is provided knockdown closed passage means providing outwardly beyond the body and the floor 6 access to the aforementioned shelter from below and preferably, as shown, from the normal body compartment.

A triangular plate 23 is hinged at an edge thereof to the bottom of the aforementioned door 2 interiorly thereof, as designated at 24, for movement from a position overlying the inside of the door to a horizontal position closing the bottom of the aforementioned closed passage. See Figures 1 and 2.

Knockdown step means are provided in said closed passage to facilitate access to said sleeping shelter and are associated with said lower wall member 14 and the associated door 2. Accordingly a triangular plate 25 is hinged at one edge on a horizontal axis to the intermediate portion of the aforementioned door 2 on the inside thereof, as designated at 26, for movement from a position overlying the inside of the door to a horizontal position. When this door 2 and the wall member 14 are positioned to form said closed passage the corresponding edge of the plate 25 is releasably engaged with the wall member 14 in a usual manner, unnecessary to be described, to support the plate 25 in this horizontal position to form a step. Another plate 27 is hinged to the aforementioned door 2 on the inside thereof on a horizontal axis, as designated at 28, for movement from a position overlying the inside of the door to a horizontal position, in which horizontal position it is releasably supported by releasable hooks 29 to form another step below the plate 24.

When not in use the wall members 14 and 16, and the plates 23, 25, and 27 are folded against the inside of the associated door 2 and are releasably secured therewith in a usual manner unnecessary to be described. See Figure 1. When the sleeping shelter is folded the curtain 12 may be stored between the roofs 4 and 7. See Figure 3.

It will be observed that the sleeping shelter afforded is comparatively commodious and is elevated with consequent comfort and privacy. It will also be observed that the closed passage means does not take any space from the shelter, and that added convenience is afforded by reason of the closed access passage communicating with the normal body compartment.

When the body is converted for sleeping, access into the body is had through one of the doors 2 thereof not utilized by said knockdown closed passage means.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a convertible vehicle body the combination with a normal roofed body structure, of means adapted to convertibly form therewith an elevated sleeping shelter including a floor arranged immediately below the normal horizontal position of the roof of the body structure and means whereby said roof is marginally pivoted on the vertical structure of the body for angular movement upwardly from its normal horizontal position to form a part of said shelter.

2. In a convertible vehicle body the combination with a normal roofed body structure having the roof thereof hinged at one side to the corresponding vertical side structure of the body for upward angular movement out of its normal horizontal position, a floor arranged immediately below the normal position of said roof, a second roof hinged at a side thereof to the other side of said first mentioned roof for angular movement from a position underlying said first mentioned roof to a position extending therefrom, means for releasably securing said roofs with said first mentioned roof extended from the body structure and said second roof extended from said first mentioned roof to form a partial sleeping shelter above said floor, and curtain means completing the sleeping shelter and adapted to permit the folding of said roofs.

3. In a convertible vehicle body the combination with a normal roofed body structure having the roof thereof hinged at one side to the corresponding vertical side structure of the body for upward angular movement out of its normal horizontal position, a floor fixed with the body structure and disposed immediately below the normal position of said roof, a second roof hinged at a side thereof to the other side of said first mentioned roof for angular movement from a position underlying said first mentioned roof to a position normal thereto, struts for releasably securing said roofs with said first mentioned roof disposed vertically and said second roof disposed horizontally to form a partial sleeping shelter above said floor and adapted to permit the folding of said roofs with said second roof underlying said first mentioned roof when said first mentioned roof is in its normal position, and curtain means completing the sleeping shelter and adapted to permit the folding of said roofs.

4. In a convertible vehicle body the combination with a normal roofed body structure having the roof thereof hinged at one side to the corresponding vertical side structure of the body for upward angular movement out of its normal horizontal position, a floor fixed with the body structure and disposed immediately below the normal position of said roof, a second roof hinged at a side thereof to the other side of said first mentioned roof for angular movement from a position underlying said first mentioned roof to a position normal thereto, struts pivoted to said second roof on axes transverse to the axis thereof and engageable, when extended from said second roof, in sockets of the body for releasably securing said roofs with said first mentioned roof disposed vertically and said second roof disposed horizontally to form a partial sleeping shelter above said floor and adapted to fold in parallelism with said second roof for the positioning thereof and said second roof under the first mentioned roof with the first mentioned roof in its normal position, and curtain means completing the sleeping shelter and adapted to permit the folding of said roof and struts.

5. In a convertible vehicle body the combination with a normal body structure, of means adapted to convertibly form therewith an elevated sleeping shelter having a floor above the floor of said normal body structure, and knockdown closed passage means providing, outwardly beyond said body, access to said shelter from below.

6. In a convertible vehicle body the combination with a normal roofed body structure, of means adapted to convertibly form thereon an elevated sleeping shelter having a floor substantially at the roof height of said normal body structure, and knockdown closed passage means utilizing an open door of said body and providing, outwardly beyond said body, access to said shelter from below.

7. In a convertible vehicle body the combination with a normal roofed closed body structure, of means adapted to convertibly form thereon an elevated sleeping shelter having a floor substantially at the roof height of said normal body structure, knockdown closed passage means utilizing an open door of said body and providing, outwardly beyond said body, access to said shelter from the normal body compartment below, and knockdown step means in said passage for facilitating access to and from said shelter through said closed passage means.

8. In a convertible vehicle body the combination with a normal roofed closed body structure, of means adapted to convertibly form thereon an elevated sleeping shelter having a floor substantially at the roof height of said normal body structure, knockdown closed passage means utilizing an open door of said body and providing, outwardly beyond said body, access to said shelter from the normal body compartment, said means including a wall member substantially coextensive with the lower portion of said door and hinged at a vertical edge thereof to the outer vertical edge of the door for movement from a position overlying the inside of the door to an extended position with respect thereto and a second wall member substantially coextensive with the upper portion of the door and hinged at a horizontal edge thereof to the upper horizontal edge of the first mentioned wall member for movement from a position overlying the first mentioned wall member to a position extending upwardly therefrom, and knockdown step means associated with said door and said first mentioned wall member for facilitating access to and from said shelter through said closed passage means.

9. In a convertible vehicle body the combination with a normal roofed body structure, of means adapted to convertibly form thereon an elevated sleeping shelter having a floor above the normal floor of the body and including curtain means forming a side of said shelter, and knockdown closed passage means, providing outwardly beyond said body and floor, access to said shelter from below and including an outwardly projecting half closure curtain formation on said curtain means open at its lower end and gradually merging upwardly into the plane of said curtain means.

10. In a convertible vehicle body the combination with a normal roofed closed body structure, means adapted to convertibly form thereon an elevated sleeping shelter having a floor substantially at the roof height of said body including curtain means forming a side of said shelter, and knockdown closed passage means utilizing an open side door of said body structure and providing, outwardly beyond said body and floor, access to said shelter from the normal body compartment and including an outwardly projecting half closure curtain formation on said curtain means open at its lower end to communicate with the closure formed partially by said open door and extending upwardly therefrom and gradually merging upwardly into the plane of said curtain means.

11. In a convertible vehicle body the combination with a normal roofed closed body structure having the roof thereof hinged at one side to the corresponding vertical side structure of the body for upward angular movement out of its normal horizontal position, a floor fixed with the body structure and disposed immediately below the normal position of said roof, means cooperating with said roof in an upright position to form a convertible shelter above said floor and including curtain means forming the side of the shelter opposite that formed by said roof in its upright position, and knockdown closed passage means, providing outwardly beyond said body and floor, access to said shelter from below at the curtain side of said shelter and including an outwardly projecting half closure curtain formation on said curtain means open at its lower end and gradually merging upwardly into the plane of said curtain means.

12. In a convertible body the combination with a normal roofed closed body structure having the roof thereof hinged at one side of the corresponding vertical side structure of the body for upward angular movement out of its normal horizontal position, a floor fixed with the body structure and disposed immediately below the normal position of said roof, means cooperating with said roof in an upright position and including curtain means forming the side of the shelter opposite that formed by said roof in said upright position, and knockdown closed passage means utilizing an open side door of said body and providing, outwardly beyond said body and floor, access to said shelter from the normal body compartment, said closed passage means including an outwardly projecting half closure curtain formation on said curtain means open at its lower end to communicate with the closure formed partially by said open door and extending upwardly therefrom and gradually merging upwardly into the plane of said curtain means.

In witness whereof I hereunto affix my signature this 21st day of July, 1927.

ELLEN WILLETT MAGILL.